United States Patent
Frank

(10) Patent No.: US 7,130,339 B2
(45) Date of Patent: Oct. 31, 2006

(54) METHOD AND APPARATUS FOR FRAME RATE DETERMINATION WITHOUT DECODING IN A SPREAD SPECTRUM RECEIVER

(75) Inventor: Colin D. Frank, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 752 days.

(21) Appl. No.: 10/334,292

(22) Filed: Dec. 31, 2002

(65) Prior Publication Data

US 2004/0125864 A1 Jul. 1, 2004

(51) Int. Cl.
*H04B 3/46* (2006.01)
*H04Q 7/28* (2006.01)

(52) U.S. Cl. ............... 375/225; 375/147; 370/342
(58) Field of Classification Search ........ 370/342, 370/328–29, 335, 232–34, 252–253; 375/224–5, 375/260–62, 340–1, 130, 142, 147, 227, 375/343, 37, 225, 261, 262, 224, 340–3; 714/794–796

See application file for complete search history.

(56) References Cited

U.S. PATENT DOCUMENTS

| | | | |
|---|---|---|---|
| 6,097,716 A | * | 8/2000 | Abrishamkar ........... 370/342 |
| 6,175,587 B1 | | 1/2001 | Madhow et al. |
| 6,175,588 B1 | | 1/2001 | Visotsky et al. |
| 6,424,631 B1 | * | 7/2002 | Czaja et al. ............ 370/252 |
| 6,463,097 B1 | * | 10/2002 | Held et al. ............. 375/225 |
| 6,560,744 B1 | * | 5/2003 | Burshtein ............... 714/774 |

OTHER PUBLICATIONS

"A ML Rate Detection Algorithm for IS-95 CDMA", Gutierrez et. al., IEEE1999.*
Cohen et al., *Multi-Rate Detection For the IS-95 CDMA Forward Traffic Channels*, pp. 1789-1793, 1995.
Cohen et al., *Multi-Rate Detection For The IS-95A CDMA Forward Traffic Channels Using The 13KBPS Speech Coder*, pp. 1844-1848, 1996.

* cited by examiner

*Primary Examiner*—Mohammed Ghayour
*Assistant Examiner*—Sophia Vlahos

(57) ABSTRACT

A spread spectrum receiver (124) for receiving and decoding a data frame having one of a plurality of coding rates is coupled to a rate determination device (132). The rate determination device (132) is coupled to receive a data frame coded at one of the plurality of coding rates and to receive symbol data from the receiver (124). The rate determination device (132) is adapted to determine a probability based at least upon an rate-based symbol repetition constraints within the data frame, wherein the probability is an indication of the rate at which the data frame is encoded.

16 Claims, 1 Drawing Sheet

METHOD AND APPARATUS FOR FRAME RATE DETERMINATION WITHOUT DECODING IN A SPREAD SPECTRUM RECEIVER

TECHNICAL FIELD

This patent relates to receivers for use in a spread spectrum communication system.

BACKGROUND

In a spread spectrum communication system, downlink transmissions from a base station to a mobile station include a pilot channel and a plurality of traffic channels. The pilot channel is demodulated by all users. Each traffic channel is intended for demodulation by a single user, though more than one channel may be intended for a given user. Therefore, each traffic channel is spread using a unique code known by both the base station and the mobile station. The pilot channel is spread using a code known by the base station and all mobile stations. Multiplication of the pilot channel and traffic channel symbols by unique code sequences comprised of chips having duration much less than the symbol duration spreads the spectrum of transmissions in the system.

One example of a spread spectrum communication system is a cellular radiotelephone system according to Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95). Individual users in the system use the same frequency spectrum but are distinguishable from each other through the use of individual spreading codes. IS-95 is an example of a direct sequence code division multiple access (DS-CDMA) communication system. In a DS-CDMA system, transmissions are spread by a pseudorandom noise (PN) code. Data is spread by a sequence of chips, where the chip is the spread spectrum minimal-duration keying element.

Other spread spectrum systems include radiotelephone and data systems operating at various frequencies and utilizing various spreading techniques. Among these additional systems are third-generation spread spectrum communication systems (3G), wideband code division multiple access systems (W-CDMA) and CDMA2000.

As allowed in IS-95 and the other direct sequence spread spectrum communication protocols, the forward link frames can be at one of four possible rates: full-rate, half-rate, quarter-rate and eighth-rate. In existing receivers, a rate determination algorithm is used to determine that rate at which the forward link frames are encoded. As is generally practiced, the received frames are decoded at each of the four possible rates using a Viterbi decoder. Typically, the inputs to the rate determination algorithm include the cyclical redundancy check (CRC) data appended to the full and half-rate frames, estimates of the channel symbol error rates based on re-encoding the Viterbi decoder output, quality bits associated with the distance between merging paths in the decoder trellis, and the total Euclidean distance between the output of the receiver and the decoded codeword.

This process is inefficient. It suffers from added current drain associated with the multiple decodings and may require a faster clock and additional circuitry. The frame needs only to be decoded once to obtain the coded data, but at the correct rate. Decoding at the wrong rate results in unusable data. Various approaches have been suggested to predict the frame rate prior to decoding, but in most instances these approaches are computationally complex and are not sufficiently reliable.

Thus, there is a need for a spread spectrum receiver that provides-pre-decoding rate determination.

BRIEF DESCRIPTION OF THE DRAWINGS

This disclosure will describe several embodiments to illustrate its broad teachings. Reference is also made to the attached drawings.

DETAILED DESCRIPTION

A spread spectrum receiver incorporates rate determination. In an embodiment of the receiver, a maximum-likelihood decision rule is applied for pre-decoding rate determination. While the following discussion refers to the IS-95 interim standard, the disclosure has application to virtually any spread spectrum communication system.

Figure 1:
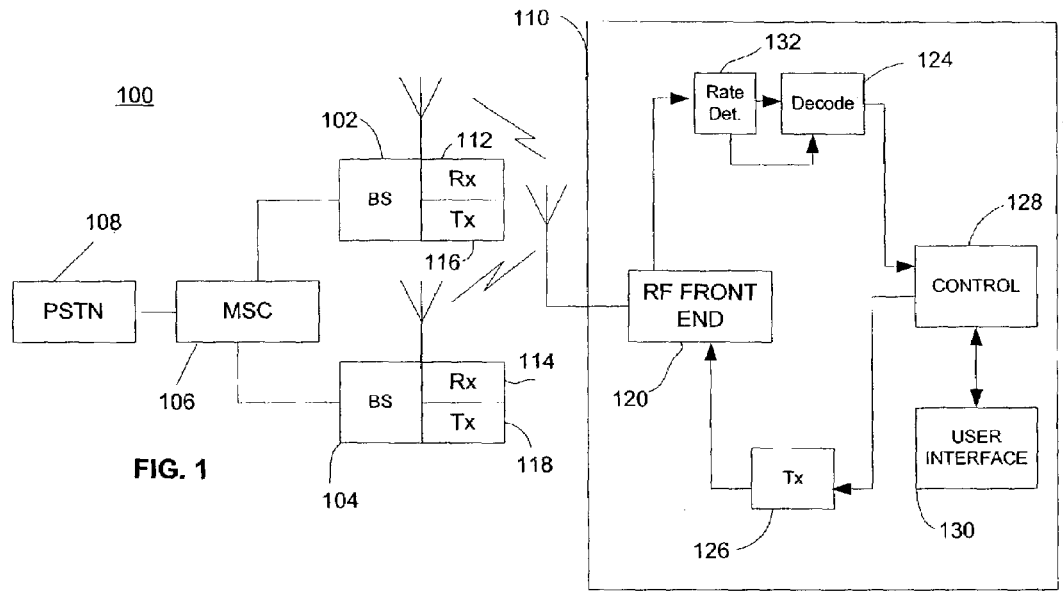
FIG. 1 is a block diagram of a communication system.

Referring to FIG. 1, a communication system 100 includes a plurality of base stations including base station 102 and base station 104. Each base station is separately coupled to a mobile switching center 106, which controls communication within the system and between the system and the public switch telephone network 108. The communication system 100 may be a cellular telephone system operating according to IS-95, CDMA2000, 3G, W-CDMA or other direct sequence spread spectrum communication standards, another type of cellular or mobile communication system, a fixed wireless loop system or other type of radio system.

Each base station is configured for radio frequency (RF) communication with fixed or mobile transceivers such as mobile station 110. Accordingly, each base station includes a receiver such as receiver 112 of the base station 102 and receiver 114 of the base station 104 and a transmitter such as transmitter 116 of the base station 102 and the transmitter 118 of the base station 104. Each transmitter transmits a spread spectrum signal including a first signal and a second signal, the first signal being substantially orthogonal to the second signal. The first signal may be, for example, the pilot channel in the IS-95 implementation and the second signal may be one or more traffic channels. In IS-95, the pilot channel and the traffic channels are covered using a Walsh or Hadamard code, so that at transmission, the channels are all substantially orthogonal.

The mobile station 110 includes a RF front end 120, a receiver 124, a transmitter 126, a control section 128 and a user interface 130. The RF front end 120 filters the spread spectrum signals and provides conversion to baseband signals. The RF front end 120 further provides analog to digital conversion, converting the baseband signals to streams of digital data for further processing. The receiver 124 demodulates the digital data and provides the demodulated data to the control section 128.

The control section 128 controls overall operation of the mobile station 110, including assignment of the RAKE fingers. The control section also controls interaction of the radio components and the user interface 130. The user interface 130 typically includes a display, a keypad, a speaker and a microphone. The transmitter 126 modulates data for transmission to a remote receiver, such as one of the base stations. The modulated data are processed by the front end 120 and transmitted at radio frequency.

Positioned between the receiver 124 and the RF front end 120 is a rate determination device 132. The rate determination device 132 may operate under the control of control 128 or may contain its own processor or other suitable processing and control capability (not depicted) to function as described herein and determines the rate of the incoming frames and communicates this information to the receiver 124. The receiver 124 uses the rate information to decode the received frames according to the rate information in an efficient manner. That is, the rate determination device 132 receives data from the receiver 124 that is then used to predict, a priori, the rate of the next frame to be decoded. The determined rate information is then communicated by the rate determination device 132 back to the receiver 124 thus allowing the receiver 124 to decode the frame one time at the correct rate.

The rate determination device 132 may use a single rate determination algorithm or multiple rate determination algorithms tailored to the various conditions in which the mobile station 110 is operating. For example, a rate determination algorithm may have parameters that are a function of the signal-to-noise ratio (SNR), the fading rate of the channel, or other channel characteristics or the algorithm may be specifically tailored for a particular coding scheme, such as Rate Set 1 or Rate Set 2. The rate determination device 132 may be informed of the channel conditions by the receiver 124 or by the control 128 in order to select an appropriate rate determination algorithm. Alternatively the rate determination device 132 may self-determine the channel characteristics.

Figure 2:
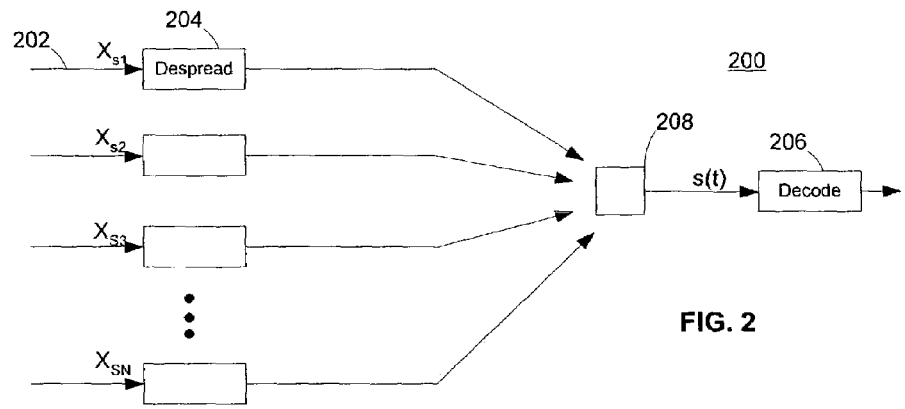
FIG. 2 is a block diagram of a spread spectrum receiver incorporating rate determination.
Figure 3:
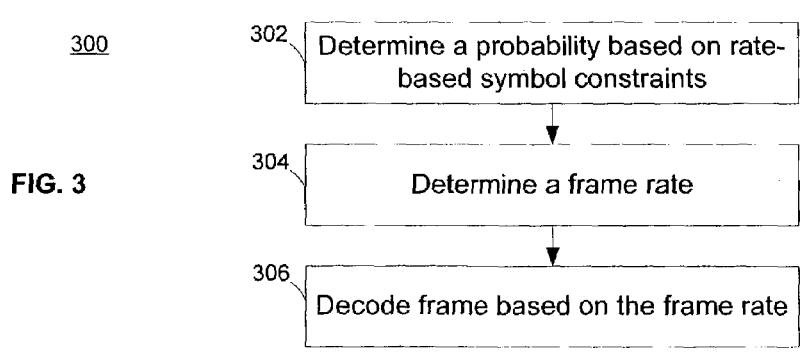
FIG. 3 is a flow diagram illustrating a method of rate determination in a spread spectrum receiver.

FIG. 2 illustrates a RAKE receiver 200 that may be incorporated into the receiver 124. The RAKE receiver 200 includes a plurality of fingers, generally illustrated as finger 202. Each finger 202 contains a despreader 204 for despreading the baseband signals received from the RF front end 120. The output signals of each finger are then multiplied by the conjugate of the estimate of the complex channel gain for the given finger and combined in a combiner 208 to provide the data signal estimate, s(t). The rate information is provided by the rate determination device 132 to the decoder 206.

The rate determination device 132 may use any rate determination algorithm suitable for the communication protocol being used within the communication system 100 and for the existing channel conditions. As an example, described herein are rate determination algorithms suitable for use with a spread spectrum code division multiple access communication system. While the above-described process of decoding each frame at each of the four possible rates may be used as one of the possible rate determination algorithms, it is preferable that the rate determination algorithm provides an indication of frame rate prior to decoding to improve computational efficiency as well as reduce decoding delay. In that regard, additional algorithms are described herein in connection with the IS-95 interim standard.

Two rate sets are defined for IS-95. In the first, referred to as Rate Set 1, a full-rate frame contains 192 information symbols that are encoded into 384 code symbols by a rate ½ convolutional encoder. Half-rate, quarter-rate and eighth-rate frames contain 96, 48 and 24 information symbols and 192, 96, and 48 code symbols, respectively. Symbol repetition is used to fill up the frame, so that half-rate code symbols are repeated twice, and quarter-rate and eighth-rate code symbols are repeated four and eight times, respectively. Interleaving is used to mitigate the degradation of the communication link caused by fading.

In Rate Set 2, a full-rate frame contains 288 information symbols, while half-rate, quarter-rate and eighth-rate frames contain 144, 72, and 36 information symbols, respectively. Rate Set 2 frames are encoded with the same rate ½ convolutional code used for Rate Set 1. Symbols of the half-rate, quarter-rate, and eighth-rate frames are repeated 2, 4 and 8 times, respectively, resulting in a total of 576 code symbols per frame, regardless of rate. After repetition, two of every six code symbols are punctured to reduce the number of symbols per frame to 384.

To simplify the discussion of the immediately following rate determination algorithm, only Rate Set 1 frames are considered. However, one of ordinary skill in the art will appreciate the modifications required to adapt the algorithm to Rate Set 2. Because of the repetition scheme used for Rate Set 1, it is possible to consider blocks of eight binary symbols. If the frame is full rate, no constraints are imposed on the sequence of symbols $\{b_1, b_2, \ldots, b_8\}$. However, for half-rate frames, a sequence is allowed if and only if $b_1=b_2$, $b_2=b_4$, $b_5=b_6$ and $b_7=b_8$. Quarter-rate frames rrquire both that $b_1=b_2=b_3=b_4$ and $b_5=b_6=b_7=b_8$. Eighth rate frames admit only the two binary sequences for which $b_1=b_2=\ldots=b_8$. Let the sequence $\{y_1, y_2, \ldots, y_8\}$ denote the corresponding output of the combiner of the RAKE receiver, e.g., combiner 208.

From the above description of the combiner output, even in the presence of fading, the ratio of the mean to the variance is the same for all symbols within a given frame, providing that forward link power control is slow so that the traffic-to-pilot power ratio is constant over the frame. If fast power control is used so that the traffic power changes every power control group, the weighting scheme must be modified so that the ratio of the symbol mean and variance is held constant over the frame.

If no a priori distribution is assigned to the possible frame rates, then the maximum a posteriori decision (MAP) rule is equivalent to the maximum-likelihood (ML) decision rule which selects the rate $r_i$, $i \equiv \{1, 2, 3, 4\}$, for which:

$$\log(p(\{y_1\}|r_i)/p(\{y_1\}|r_1))$$

is maximized. From this equation it is apparent that only three log-likelihood ratios need to be calculated, since the log-likelihood ratio for full rate will always be 0. The four log-likelihood ratios are:

$$\log\frac{p(\{y_i\}|r_1)}{p(\{y_i\}|r_1)} = 0$$

$$\log\frac{p(\{y_i\}|r_2)}{p(\{y_i\}|r_1)} \approx 4\log 2 - 2\gamma\Delta_1$$

$$\log\frac{p(\{y_i\}|r_3)}{p(\{y_i\}|r_1)} \approx 6\log 2 - 2\gamma(\Delta_1 + \Delta_2)$$

$$\log\frac{p(\{y_i\}|r_4)}{p(\{y_i\}|r_1)} \approx 7\log 2 - 2\gamma(\Delta_1 + \Delta_2 + \Delta_3)$$

The terms $\Delta_1$, $\Delta_2$ and $\Delta_3$ are:

$$\Delta_1 = \sum_{i=1}^{4} \delta(y_{2i-1}, y_{2i})$$

-continued $$\Delta_2 = \sum_{i=0}^{1} \delta(s_{4i+1,4i+2}, s_{4i+3,4i+4})$$

$$\Delta_3 = \delta(s_{1,4}, s_{5,8})$$

where the partial-sum $s_{j,k}$ is given by $$s_{j,k} = \sum_{i=j}^{k} y_i.$$

The parameter $\gamma$ is the ratio of the mean and variance of $y_i$, the output of the combiner for each symbol. This mean, however, is not known a priori. By modifying the receiver hardware, an estimation of $\gamma$ can be made according to the equation:

$$\hat{\gamma} = \frac{\sum_{i=1}^{384} |y_i|}{\left(A_p^2 \sum_{i=1}^{384} \sum_{j=1}^{3} \|\hat{a}_{i,j}\|^2\right) \sigma^2} \approx \frac{A_t \mu(r_i)}{A_p \sigma^2}$$

where $A_p^2$ is the pilot amplitude and $a_{i,j}$ is the complex channel gain of the different multipath rays. In the middle expression, the first term in the denominator is the sum of the squares of the channel estimates for the entire frame, and the second term $\sigma^2$ is known since it is determined by the receiver automatic gain control (AGC) circuit. Thus, while relatively computationally complex, it is possible to make an estimate of the parameter $\gamma$.

All of the data dependence in the log-likelihood ratios is captured in the terms $\Delta 1$, $\Delta 2$ and $\Delta 3$. Examination of these terms yields the following observations:

i) if two adjacent symbols (or partial sums) have the same sign, the corresponding contribution to the log-likelihood ratio is 0;

ii) the contribution of adjacent symbols (partial sums, $s_{i,j}$) different in sign to the log-likelihood ratio is equal to the minimum amplitude of the two symbols (partial sums);

iii) symbols (partial sums) differing in sign are attributed significance equal to $\gamma$, the ratio of the symbol mean and variance for the given frame.

The first observation is consistent with intuition since it is only when adjacent symbols have different signs that they are not repetitions of the same symbol. Symbols that agree yield essentially no information because even if the rate is such that the second symbol is not required to be a repetition of the first, it is still allowed to be the same binary value as the first. The second observation also agrees with intuition since the confidence that two symbols agree or differ in sign should correspond (approximately) to the smaller of the two symbol amplitudes (e.g., given two symbols with amplitudes 0.25 and 100, the confidence that the two symbols have the same or different sign should be approximately equal to the smaller of the two amplitudes; i.e., 0.25.

In implementation, the rate determination device 132 implements the above-described log-likelihood ratios. The rate decision is based on which of the log-likelihood ratios is largest.

An alternative, simplified rule can be constructed for selecting between the four rates based on the above observations. Essentially, the measure of interest is the sum reliability of those pairs of symbols (or partials sums $$s_{j,k} = \sum_{i=j}^{k} y_i)$$

having opposite sign relative to the sum reliability of all pairs of symbols (or partial sums) in the frame. Thus, the sum reliability of all pairs of symbols (partial sums) is used to normalize the reliability pairs of the symbols (partial sums) having opposite sign. With this motivation, the following three measures may be defined:

$$\Psi_2 = \frac{\sum_{i=0}^{191} \delta(y_{2i+1}, y_{2i+2})}{\sum_{i=0}^{191} \min\{|y_{2i+1}|, |y_{2i+2}|\}}$$

$$\Psi_3 = \frac{\sum_{i=0}^{95} \delta(s_{4i+1,4i+2}, s_{4i+3,4i+4})}{\sum_{i=0}^{95} \min\{|s_{4i+1,4i+2}|, |s_{4i+3,4i+4}|\}}$$

$$\Psi_4 = \frac{\sum_{i=0}^{47} \delta(s_{8i+1,8i+4}, s_{8i+5,8i+8})}{\sum_{i=0}^{47} \min\{|s_{8i+1,8i+4}|, |s_{8i+5,8i+8}|\}}$$

In the above, all three summations have been extended over the entire frame.

All three measures defined above lie in the interval [0,1]. The measure $\psi_2$ weighs the reliability of pairs of symbols having opposite sign against the sum reliability of all pairs of symbols in the frame. Only pairs of symbols having opposite sign contribute to the numerator of $\psi_2$, while all pairs of symbols contribute to the denominator. Similarly, $\psi_3$ and $\psi_4$ measure the reliability of pairs of partial sums having opposite sign relative to the reliability of all pairs of partial sums in the frame. These expressions are relatively computationally equivalent.

The measures have the following properties:

i) for any value of the signal-to-noise ratio $E_b/N_0$, $E(\Psi_2|r_1)=0.5$ $E(\Psi_3|r_1)=E(\Psi_3|r_2)=0.5$ $E(\Psi_4|r_1)=E(\Psi_4|r_2)=E(\Psi_4|r_3)=0.5$ ii) in the limit as $Eb/No \to \infty$, $E(\Psi_2|r_2)=E(\Psi_2|r_3)=E(\Psi_2|r_4)=0$ $E(\Psi_3|r_3)=E(\Psi_3|r_4)=0$ $E(\Psi_4|r_4)=0.$ The Rate Set 1 decision rule is thus:
Given a threshold $\eta_1$,
i) if $\Psi_4 \leq \eta_1$, rate=$r_4$;
ii) if $\Psi_3 \leq \eta_1$ and $\Psi_4 > \eta_1$, rate=$r_3$;
iii) if $\Psi_2 \leq \eta_1$ and $\Psi_3 > \eta_1$ and $\Psi_4 > \eta_1$, rate=$r_2$;
iv) if $\Psi_2 > \eta_1$ and $\Psi_3 > \eta_1$ and $\Psi_4 > \eta_1$, rate=$r_1$ This decision rule exhibits an error floor that is a function of the threshold. The error floor may be made arbitrarily small by reducing the threshold $\eta_1$ (the limit on the error floor is $2^{-48}$, which is the probability that all 48 symbol pairs of a quarter-rate frame are equal). However, as the threshold is decreased, rate detection performance may be degraded at low values of $E_b/N_0$. Thus, reducing the threshold $\eta_1$ reduces the error floor and improves asymptotic performance while degrading rate detection performance at low signal-to-noise ratios. Ideally, if an estimate of the channel quality could be obtained, the threshold $\eta_1$ would be based on this quality estimate. This decision rule also suggests better performance on a fading channel than on a static channel.

For Rate Set 2, a separate set of metrics is required. These metrics are:

$$\Omega_2 = \frac{\sum_{i=0}^{95} \delta(y_{4i+1}, y_{4i+2})}{\sum_{i=0}^{95} \min\{|y_{4i+1}|, |y_{4i+2}|\}}$$

$$\Omega_3 = \frac{\sum_{i=0}^{47} [\delta(s_{8i+1,8i+2}, y_{8i+3}) + \delta(y_{8i+4}, s_{8i+5,8i+6}) + \delta(y_{8i+7}, y_{8i+8})]}{\sum_{i=0}^{47} [\min(|s_{8i+1,8i+2}|, |y_{8i+3}|) + \min(|y_{8i+4}|, |s_{8i+5,8i+6}|) + \min(|y_{8i+7}|, |s_{8i+8}|)]}$$

$$\Omega_4 = \frac{\sum_{i=0}^{23} [\delta(s_{16i+1,16i+3}, s_{16i+4,16i+6}) + \delta(s_{16i+7,16i+8}, s_{16i+9,16i+11}) + \delta(s_{16i+12,16i+14}, s_{16i+15,16i+16})]}{\sum_{i=0}^{23} [\min(|s_{16i+1,16i+3}|, |s_{16i+4,16i+6}|) + \min(|s_{16i+7,16i+8}|, |s_{16i+9,16i+11}|) + \min(|s_{16i+12,16i+14}|, |s_{16i+15,16i+16}|)]}$$

The difference between these definitions and those given above for Rate Set 1 are due to the difference in the symbol repetition patterns used for the two rate sets. The properties ascribed above to the measures $\{\psi_2, \psi_3 \text{ and } \psi_4\}$ apply also to the measures $\{\Omega_2, \Omega_3, \Omega_4\}$. The Rate Set 2 decision rule is given by the following:

Given a threshold $\eta_2$,
i) if $\Omega_4 \leq \eta_2$, rate=$r_4$;
ii) if $\Omega_3 \leq \eta_2$ and $\Omega_4 > \eta_2$, rate=$r_3$;
iii) if $\Omega_2 \leq \eta_2$ and $\Omega_3 > \eta_2$ and $\Omega_4 > \eta_2$, rate=$r_2$;
iv) if $\Omega_2 > \eta_2$ and $\Omega_3 > \eta_2$ and $\Omega_4 > \eta_2$, rate=$r_1$ This rate detection rule has little impact on the decoded frame error rate if the target frame error probability is $10^{-2}$ or higher. Advantageously, (with respect to rate determination only) because of the relatively weaker coding scheme of Rate Set 2, a greater value of $E_b/N_0$ is required to achieve the required $10^{-2}$ frame error rate performance. Furthermore, because of the higher coding rate, a given value of the bit signal-to-noise ration $E_b/N_o$ corresponds to a larger value of the symbol signal-to-noise ratio $E_s/N_o$ for Rate Set 2 than for Rate Set 1. Since it is $E_s/N_o$, rather than $E_b/N_o$, which most directly affects rate detection performance, overall rate detection performance is slightly better for Rate Set 2 than for Rate Set 1.

An additional decision rule that can be used for Rate Set 1, and can be extended to Rate Set 2 as well as to other rate set definitions with multiple frame rates implemented using repetition and puncturing, is given by the following:

Rate=$r_i$, where
$i = \arg \max \{\Lambda_i^3, i \in \{1, 2, 3, 4\}\}$,
with $$\Lambda_1^3 = a_1 \left( \left( \sum_{i=1}^{8} y_i^2 \right) - 8\delta^2 \right),$$

$$\Lambda_2^3 = a_2(s_{1,2}^2 + s_{3,4}^2 + s_{5,6}^2 + s_{7,8}^2) - 8\delta^2),$$

$$\Lambda_3^3 = a_3((s_{1,4}^2 + s_{5,8}^2) - 8\delta^2),$$

$$\Lambda_4^3 = a_4(s_{1,8}^2 - 8\delta^2),$$

and $\delta$ is the interference variance at the output of the RAKE combiner, which can be estimated as $$\hat{\delta}^2 = \left( \sum_{i=0}^{383} \|y_i\|^2 \right) - \left( \sum_{i=0}^{383} \|y_i\| \right)^2,$$

or over a smaller subset of the channel symbols.

A maximin criteria can be used to select $\{a_i\}$. However, simulations have shown that the following values for $\{a_i\}$ yield better results, $$a_1 = 1, a_2 = \frac{1}{\sqrt{2}}, a_3 = \frac{1}{2}, a_4 = \frac{1}{2\sqrt{2}}.$$

so that this additional Rate Set 1 decision rule is given by
Rate=$r_i$, where
$i = \arg \max \{\Lambda_i^3, i \in \{1, 2, 3, 4\}\}$,
with $$\Lambda_1^3 = \left( \left( \sum_{i=1}^{8} y_i^2 \right) - 8\delta^2 \right),$$

-continued $$\Lambda_2^3 = \frac{1}{\sqrt{2}}((s_{1,2}^2 + s_{3,4}^2 + s_{5,6}^2 + s_{7,8}^2) - 8\delta^2),$$

$$\Lambda_3^3 = \frac{1}{2}((s_{1,4}^2 + s_{5,8}^2) - 8\delta^2),$$

$$\Lambda_4^3 = \frac{1}{2\sqrt{2}}(s_{1,8}^2 - 8\delta^2),$$

This patent describes several specific embodiments including hardware and software embodiments of apparatus and methods for pre-decoding rate determination. However, one of ordinary skill in the art will appreciate that various modifications and changes can be made to these embodiments. Accordingly, the specification and drawings are to be regarded in an illustrative rather than restrictive sense, and all such modifications are intended to be included within the scope of the present patent.

We claim:

1. A spread spectrum receiver for receiving and decoding a data frame having one of a plurality of coding rates, the spread spectrum receiver comprising:

a rate determination device coupled to receive a data frame coded at one of the plurality of coding rates and to receive symbol data from the receiver, the rate determination device being adapted to determine a probability based at least upon rate-based symbol repetition constraints within the data frame, wherein the probability is an indication of the rate at which the data frame is encoded, wherein the probability comprises a log likelihood ratio based at least upon the rate-based symbol repetition constraints within the data frame and wherein the log likelihood ratio indicative of the rate is the maximum of the group of log likelihood ratios comprising:

$$\log\frac{p(\{y_i\}|r_1)}{p(\{y_i\}|r_1)} = 0$$

$$\log\frac{p(\{y_i\}|r_2)}{p(\{y_i\}|r_1)} \approx 4\log 2 - 2\gamma\Delta_1$$

$$\log\frac{p(\{y_i\}|r_3)}{p(\{y_i\}|r_1)} \approx 6\log 2 - 2\gamma(\Delta_1 + \Delta_2)$$

$$\log\frac{p(\{y_i\}|r_4)}{p(\{y_i\}|r_1)} \approx 7\log 2 - 2\gamma(\Delta_1 + \Delta_2 + \Delta_3)$$

where $y_i$ represents a sequence of received symbols, $r_i$ represents the coding rates, $\Delta$ represents a reliability that pairs of symbols or partial sums have a same sign or opposite signs, and $\gamma$ represents a ratio of mean and variance of $v_i$ a decoder, decoding the received data frame according to the determined frame rate.

2. The spread spectrum receiver of claim 1, comprising a decision rule based upon the probability.

3. The spread spectrum receiver of claim 2, wherein the decision rule comprises:
i) if $\Psi_4 \leq \eta_1$, rate=$r_4$;
ii) if $\Psi_3 \leq \eta_1$ and $\Psi_4 > \eta_1$, rate=$r_3$;
iii) if $\Psi_2 \leq \eta_1$ and $\Psi_3 > \eta_1$ and $\Psi_4 > \eta_1$, rate=$r_2$;
iv) if $\Psi_2 > \eta_1$ and $\Psi_3 > \eta_1$ and $\Psi_4 > \eta_1$, rate=$r_1$, and
wherein $\Psi$ measures a reliability that pairs of symbols or partial sums have a same sign or opposite signs and $\eta$ represents a threshold.

4. The spread spectrum receiver of claim 2, wherein the decision rule comprises:
i) if $\Omega_4 \leq \eta_2$, rate=$r_4$;
ii) if $\Omega_3 \leq \eta_2$ and $\Omega_4 > \eta_2$, rate=$r_3$;
iii) if $\Omega_2 \leq \eta_2$ and $\Omega_3 > \eta_2$ and $\Omega_4 > \eta_2$, rate=$r_2$;
iv) if $\Omega_2 > \eta_2$ and $\Omega_3 > \eta_2$ and $\Omega_4 > \eta_2$, rate=$r_1$, and
wherein $\Omega$ measures a reliability that pairs of symbols or partial sums have a same sign or opposite signs and $\eta$ represents a threshold.

5. The spread spectrum receiver of claim 2, wherein the decision rule comprises:
rate=$r_i$, where
i=arg max{$\Lambda_i^3$, i$\in$\{1, 2, 3, 4\}},
with $$\Lambda_1^3 = a_1\left(\left(\sum_{i=1}^{8} y_i^2\right) - 8\delta^2\right),$$

$$\Lambda_2^3 = a_2((s_{1,2}^2 + s_{3,4}^2 + s_{5,6}^2 + s_{7,8}^2) - 8\delta^2),$$

$$\Lambda_3^3 = a_3((s_{3,4}^2 + s_{5,8}^2) - 8\delta^2),$$

$$\Lambda_4^3 = a_4(s_{1,8}^2 - 8\delta^2),$$

and $\delta$ is at least an estimate of the interference variance at the output of the RAKE combiner and wherein $\Lambda$ measures a reliability that pairs of symbols or partial sums have a same sign or opposite signs and $s_{j,k}$ represent partial sums and j,k denote the first and last symbols of the span of symbols included in the partial sum.

6. The spread spectrum receiver of claim 1, comprising a plurality of rate determination algorithms, the rate determination device operable to select one of the plurality of rate determination algorithms based upon a channel characteristic.

7. The spread spectrum receiver of claim 6, wherein the channel characteristic comprises one of the group of characteristics comprising: signal-to-noise ratio (SNR), symbol energy-to-noise ratio ($E_sN_0$), bit energy-to-noise ratio ($E_b/N_0$), characteristics of the channel fading process such as fading rate, and rate set.

8. In a spread spectrum receiver for receiving and decoding a data frame having one of a plurality of coding rates, a method for decoding received data frames comprising:
determining a probability based upon rate-based symbol repetition constraints within a received data frame;
determining a frame rate based upon the probability; and
decoding the received data frame according to the determined frame rate, wherein the step of determining a probability comprises determining a log likelihood ratio based at least upon the rate-based symbol repetition constraints within the data frame and
wherein the log likelihood ratio indicative of the rate is the maximum of the group of log likelihood ratios comprising:

$$\log\frac{p(\{y_i\}|r_1)}{p(\{y_i\}|r_1)} = 0$$

$$\log\frac{p(\{y_i\}|r_2)}{p(\{y_i\}|r_1)} \approx 4\log 2 - 2\gamma\Delta_1$$

-continued $$\log\frac{p(\{y_i\}\mid r_3)}{p(\{y_i\}\mid r_1)} \approx 6\log 2 - 2\gamma(\Delta_1 + \Delta_2)$$

$$\log\frac{p(\{y_i\}\mid r_4)}{p(\{y_i\}\mid r_1)} \approx 7\log 2 - 2\gamma(\Delta_1 + \Delta_2 + \Delta_3)$$

where $v_i$ represents a sequence of received symbols, $r_i$ represents the coding rates, $\Delta$ represents a reliability that pairs of symbols or partial sums have a same sign or opposite signs, and $\gamma$ represents a ratio of mean and variance of $y_i$.

9. The method of claim 8, wherein the step of determining the frame rate comprises applying a decision rule based upon the probability.

10. The method of claim 9, wherein the decision rule comprises:
  i) if $\Psi_4 \leq \eta_1$, rate=$r_4$;
  ii) if $\Psi_3 \leq \eta_1$ and $\Psi_4 > \eta_1$, rate=$r_3$;
  iii) if $\Psi_2 \leq \eta_1$ and $\Psi_3 > \eta_1$ and $\Psi_4 > \eta_1$, rate=$r_2$;
  iv) if $\Psi_2 > \eta_1$ and $\Psi_3 > \eta_1$ and $\Psi_4 > \eta_1$, rate=$r_1$, and
  wherein $\Psi$ measures a reliability that pairs of symbols or partial sums have a same sign or opposite signs and $\eta$ represents a threshold.

11. The method of claim 9, wherein the decision rule comprises:
  i) if $\Omega_4 \leq \eta_2$, rate=$r_4$;
  ii) if $\Omega_3 \leq \eta_2$ and $\Omega_4 > \eta_2$, rate=$r_3$;
  iii) if $\Omega_2 \leq \eta_2$ and $\Omega_3 > \eta_2$ and $\Omega_4 > \eta_2$, rate=$r_2$;
  iv) if $\Omega_2 > \eta_2$ and $\Omega_3 > \eta_2$ and $\Omega_4 > \eta_2$, rate=$r_1$, and
  wherein $\Omega$ measures a reliability that pairs of symbols or partial sums have a same sign or opposite signs and $\eta$ represents a threshold.

12. The spread spectrum receiver of claim 9, wherein the decision rule comprises:
  rate=$r_i$, where
    i=arg max$\{\Lambda_i^3, i \in \{1,2,3,4\}\}$,
  with $$\Lambda_1^3 = a_1\left(\left(\sum_{i=1}^{8} y_i^2\right) - 8\delta^2\right),$$

$\Lambda_2^3 = a_2((s_{1,2}^2 + s_{3,4}^2 + s_{5,6}^2 + s_{7,8}^2) - 8\delta^2)$, $\Lambda_3^3 = a_3((s_{1,4}^2 + s_{5,8}^2) - 8\delta^2)$, $\Lambda_4^3 = a_4(s_{1,8}^2 - 8\delta^2)$, and $\delta$ is at least an estimate of the interference variance at the output of the RAKE combiner and wherein $\Lambda$ measures a reliability that pairs of symbols or partial sums have a same sign or opposite signs and $s_{j,k}$ represent partial sums and j,k denote the first and last symbols of the span of symbols included in the partial sum.

13. The method of claim 8, comprising the step of selecting from a plurality of rate determination algorithms a rate determination algorithm to be used to determine the frame rate based upon a channel characteristic.

14. The method of claim 13, wherein the channel characteristic comprises one of the group of chatacteristics comprising: signal-to-noise ratio (SNR), symbol energy-to-noise ratio ($E_s/N_0$), bit energy-to-noise ratio ($E_b/N_0$), characteristics of the channel fading process such as fading rate, and rate set.

15. A spread spectrum receiver for receiving and decoding a data frame having one of a plurality of coding rates comprising:
  means for determining a probability based upon rate-base symbol repetition constraints within a received data frame;
  means for determining a frame rate based upon the probability; and
  means for decoding the received data frame according to the determined frame rate wherein determining a probability comprises determining a log likelihood ratio based at least upon the rate-based symbol repetition constraints within the data frame and wherein the log likelihood ratio indicative of the rate is the maximum of the group of log likelihood ratios comprising:

$$\log\frac{p(\{y_i\}\mid r_1)}{p(\{y_i\}\mid r_1)} = 0$$

$$\log\frac{p(\{y_i\}\mid r_2)}{p(\{y_i\}\mid r_1)} \approx 4\log 2 - 2\gamma\Delta_1$$

$$\log\frac{p(\{y_i\}\mid r_3)}{p(\{y_i\}\mid r_1)} \approx 6\log 2 - 2\gamma(\Delta_1 + \Delta_2)$$

$$\log\frac{p(\{y_i\}\mid r_4)}{p(\{y_i\}\mid r_1)} \approx 7\log 2 - 2\gamma(\Delta_1 + \Delta_2 + \Delta_3)$$

where $y_i$ represents a sequence of received symbols, $r_i$ represents the coding rates, $\Delta$ represents a reliability that pairs of symbols or partial sums have a same sign or opposite signs, and $\gamma$ represents a ratio of mean and variance and $y_i$.

16. The spread spectrum receiver of claim 15, comprising means for selecting from a plurality of rate determination algorithms a rate determination algorithm to be used to determine the frame rate based upon a channel characteristic.

* * * * *